United States Patent [19]
Bahr et al.

[11] Patent Number: 4,781,835
[45] Date of Patent: Nov. 1, 1988

[54] DISK CONCENTRATORS

[75] Inventors: Theodor Bahr, Heidenheim; Rolf Laible, Giengen; Ference Bilics, Heidenheim, all of Fed. Rep. of Germany

[73] Assignee: J. M. Voith, GmbH, Heidenheim, Fed. Rep. of Germany

[21] Appl. No.: 894,208

[22] Filed: Aug. 7, 1986

[30] Foreign Application Priority Data

Aug. 8, 1985 [DE] Fed. Rep. of Germany ....... 3528429

[51] Int. Cl.$^4$ ............................................. B01D 33/26
[52] U.S. Cl. ..................................... 210/331; 210/402; 210/486
[58] Field of Search ............... 210/331, 345, 347, 402, 210/456, 486

[56] References Cited

U.S. PATENT DOCUMENTS

| 2,593,707 | 4/1952 | Walker | 210/402 |
|---|---|---|---|
| 2,725,145 | 11/1955 | Mylius | 210/402 |
| 3,193,105 | 7/1965 | Putram | 210/486 |
| 4,056,473 | 11/1977 | Nilsson | 210/331 |
| 4,136,028 | 1/1979 | Toivonen | 210/331 |
| 4,138,338 | 2/1979 | Velinsky et al. | 210/327 |
| 4,139,472 | 12/1979 | Simonson | 210/331 |
| 4,321,140 | 3/1982 | Luthi | 210/331 |
| 4,330,405 | 5/1982 | Davis et al. | 210/331 |
| 4,626,351 | 12/1986 | Führing | 210/331 |

FOREIGN PATENT DOCUMENTS

| 3235003 | 3/1984 | Fed. Rep. of Germany . | |
|---|---|---|---|
| 466032 | 7/1975 | U.S.S.R. | 210/347 |
| 971423 | 11/1982 | U.S.S.R. | 210/402 |

Primary Examiner—Richard V. Fisher
Assistant Examiner—Linda S. Evans
Attorney, Agent, or Firm—Albert L. Jeffers; Richard L. Robinson

[57] ABSTRACT

Filter chambers composed of two adjacent filter disks are attached to a drum-like filtrate collection chamber and are adapted to rotate therewith. The filtrate penetrates the filter disks and enters the collection chamber and thereafter exits the collection chamber through a collection space. The collection space is sealed from the trough by means of a rotating seal. The suspension inlet is provided on a sidewall of the trough and the suspension outlet is provided on the opposite wall of the trough. The disk concentrator serves to remove filtrate from aqueous suspensions containing fibrous components.

2 Claims, 2 Drawing Sheets

DISK CONCENTRATORS

BACKGROUND OF THE INVENTION

The present invention relates to a disk concentrator utilizing filter disks which are arranged for rotation, essentially parallel with one another in a trough. The filter disks are at a mutual distance from one another and each filter disk has at least one screen surface or screen area. The screen surfaces are combined together in pairs to produce filter chambers. A suspension inlet is situated on one of the side end walls of the trough upstream of the filter chamber in relation to the flow therethrough. The concentrator serves to remove the filtrate from aqueous suspensions containing fibrous components such as a paper or wastepaper suspension.

One prior art disk concentrator of a similar type is disclosed in DE-A32 35 003. This prior art disk concentrator includes filter chambers made up of adjacent filter disks. The filter chambers contain the introduced suspension and are open at their radial edge. These filter chambers, together with rotating seals attached thereto, alternately make up, together with corresponding flange-like projections on the trough, chambers for the filtrate. In each case, the chambers for the filtrate must be provided with an outlet which is separated from the rest of the contents of the trough. In this previously disclosed arrangement, the filtrate outlet from the filtrate chambers is located on the floor of the trough and at the lowest part of the filtrate chambers. A considerable disadvantage of this prior art design is the presence of many sliding seals, because in each case, the filter chambers must be sealed against the adjacent filter chamber. Furthermore, the prior art design is disadvantageous in that the seals are arranged in an area of high peripheral speed.

Other disk concentrators of similar construction are known to serve primarily for the recovery of fibrous material from the effluent or recirculating water which is present as part of the paper manufacturing process. In these disk concentrators, a dense filter cake is produced on the screen material by means of negative pressure inside the filter disks. The negative pressure or vacuum is provided via vertical pipelines. In one of these prior art embodiments, according to DE-AS 26 26 458, it has been attempted to create a concentrator or to provide the effect of a concentrator by various specific methods. These methods include the use of a means to create turbulence in the flow, essentially in the vicinity of the filter disks in order to prevent the rapid formation of a dense filter cake on the screen material. In practice, however, this method has proved to be generally unsuccessful.

SUMMARY OF THE INVENTION

The disk concentrator, according to the present invention, is designed to overcome the above-discussed disadvantages associated with the prior art mechanisms. The filter disks are arranged for rotation in a trough filled with a suspension. The filter disks, in operation, are partially above the suspension. Accordingly, in the present invention, only a loose filter layer is present or is allowed to form on the filter disks while they are in the suspension and, upon withdrawal of the filter disks from the suspension, as the disks rotate, the loose filter layer falls back immediately into the suspension. This process of removing the filter layer from the filter disks is assisted further by a quantity of water (filtrate) which impedes the adhesion of the fibers to the filter screen by being carried along as a result of the rotational speed of the filter disks. The filtrate is provided to generally all screen areas by screen grating and reinforcing ribs located inside of the disks.

The object of the present invention is to provide a disk concentrator which requires considerably fewer seals and is of generally simpler construction than the previously disclosed concentrators. It is also the object of the present invention to provide a concentrator wherein the loose filter layer forming on the screen surfaces is continually removed therefrom.

In one form thereof, the present invention relates to a disk concentrator including a plurality of filter disks arranged for rotation essentially parallel with one another in a trough. Each filter disk includes a screen surface and the screen surfaces form filter chambers. The filter disks are attached to a drum-like filtrate collection chamber and the collection chamber rotates together with the filter disks. The filter chambers communicate with the collection chamber. The collection chamber has an outlet orifice and a rotating seal radially outside the outlet orifice for sealing the outlet orifice from the inside of the trough.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein:

FIG. 3 is a larger scale, detailed, partial cross-sectional view of the filter disks shown in FIG. 1.

Figure 1:
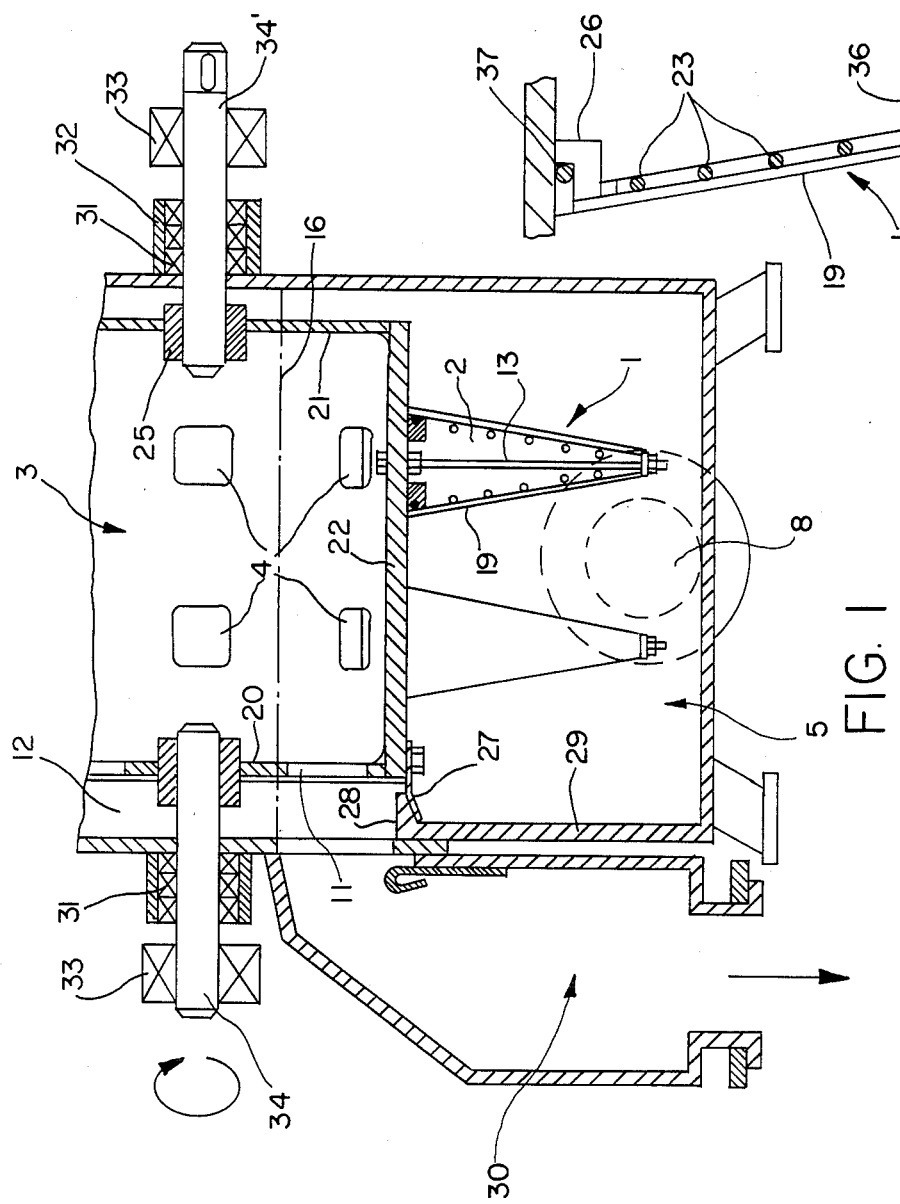
FIG. 1 is a cross-sectional elevation view of the disk concentrator according to the present invention and showing two filter chambers.

Corresponding reference characters indicate corresponding parts throughout the several views of the drawings. The exemplifications set out herein illustrate a preferred embodiment of the invention in one form thereof and such exemplifications are not to be construed as limiting the scope of the disclosure or the scope of the invention in any manner.

DETAILED DESCRIPTION OF A PREFERRED EMBODIMENT

In a specific embodiment of the disk concentrator, according to the present invention, filter disks 1 form rotating filter chambers 2 and rotate in a trough 5. Filter disks 1 are attached to peripheral wall 22 of rotating filtrate chamber 3 by means of retaining bolts 13. Peripheral wall 22 of the drum-like structure has inlet orifices 4 for enabling the filtrate to flow from filter chambers 2 into rotating filtrate chamber 3. The filtrate flows out of chamber 3 through evenly distributed outlet orifices 11 located on end wall 20. It should be noted that similar orifices can be located on end wall 21 to also allow the filtrate to flow out of chamber 3. Run-off space or chamber 12 of trough or cavity 5 is sealed against the inlet area of trough 5 by means of a rotating annular seal 27 preferably made of a plastic material exhibiting elastic characteristics. Annular seal 27 is positioned at the circumference of end wall 20 of filter chamber 3. Annular seal 27 is in continuous sealing contact against a counter sealing surface of flange 28 provided on end wall 29 of trough 5.

Figure 4:
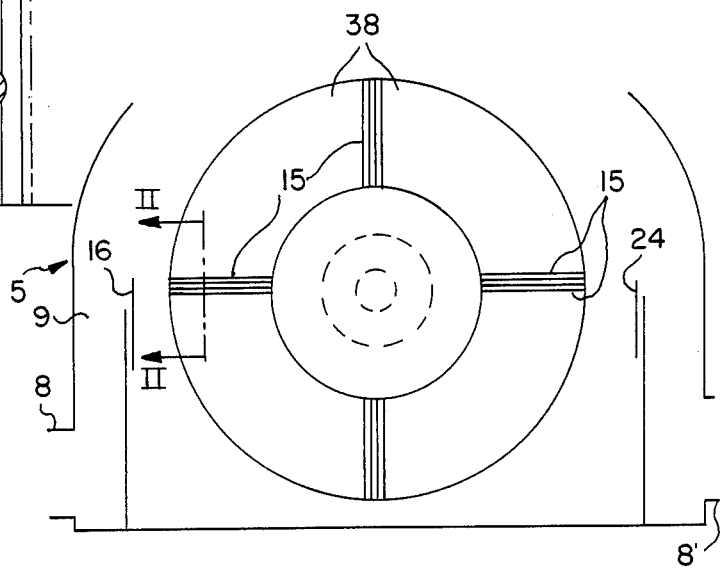
FIG. 4 is a diagrammatic cross-sectional elevation view of the concentrator shown in FIG. 1.

As more clearly shown in FIG. 4, the suspension is supplied to trough 5 and filter chambers 2 via connecting piece suspension inlet 8, inlet 9, and weir 16. It should be noted that the suspension inlet may be in the form of tubes with nozzles directed against filter disks 1. The suspension exits trough 5 and filter chambers 2 through connection piece suspension outlet 8' by first traveling over overflow weir 24.

Filtrate outlet chamber 30 is provided for the purpose of collecting the filtrate exiting outlet orifice 11. Filtrate chamber 3 is supported in bearings 33 by means of shaft ends 34 and 34'. Each shaft end is sealed from trough 5 by means of glands 31 encased in cylindrical members 32.

As can be appreciated, filter chambers 2 provide substantially no resistance to the filtrate therein as disks 1 rotate because, for example, retaining bolts 13 have a substantially small diameter such that they exhibit substantially no significant resistance to the flow of the filtrate. It should also be noted that bolts 13 also do not provide any significant resistance with respect to the suspension in trough 5 as disks 1 rotate therein. As shown in FIG. 1 the filter disk surfaces approach each other at a steep angle toward their radially outer edge and are maintained at the angle when the filter disk segments are secured to the filter chamber.

Figure 2:
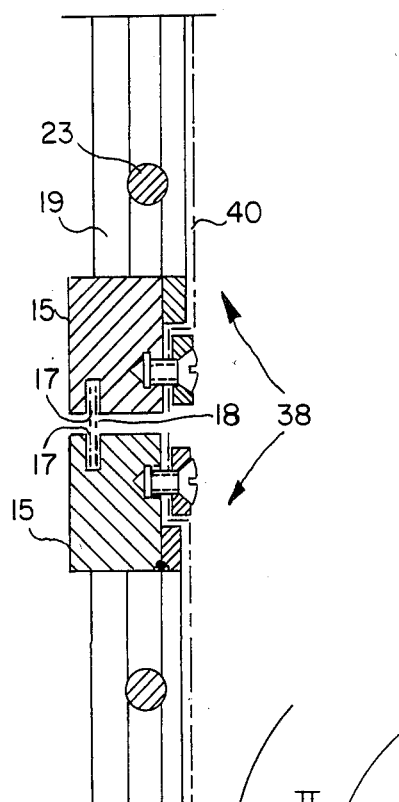
FIG. 2 is a cross-sectional view along line II—II of FIG. 4 showing a detail of the seal for the screen segments according to the present invention.

Special measures have been applied at the inner section of the individual screen segments 38 so as to keep the overall flow resistance of filter disks 1 within the suspension in trough 5 as low as possible. As a general rule, not more than 4 screen segments are used per disk. As shown in FIG. 4, the filter disks are constructed of four, quarter-circle, segments. As shown in the drawings, in the present embodiment, the individual screen segments 38 consist of radial rods 19 and rods 23 which run transversely to rods 19 to form a grating. Rods 19 and 23 are attached to one another by welding. Further, rods 19 and 23 are also attached to ribs 15, at least in the vicinity of the separating grooves. These component parts form a supporting framework attached individually to filtrate chamber 3 by means of retaining bolts 13. Screen material 40, indicated by a dotted-dashed line in FIG. 2, is attached to reinforcing ribs 15 by means of clamping strips 41 which are themselves attached to ribs 15 by screws. Each reinforcing rib 15 is provided with a groove 17. Grooves 17 in adjacent reinforcing ribs 15 are adapted to lie opposite one another so that a tongue 18 may be installed between them to serve as a sealing element. Tongue 18 preferably consists of a plastic material or a strip of sheet metal. Through the use of grooves 17 and tongue 18, it is also possible to compensate for errors of alignment and other dimensional inaccuracies.

By the above-described construction of reinforcing ribs 15 and retaining bolts 13, flow baffles acting in the peripheral direction are essentially eliminated. Further, bulkhead walls are essentially not needed in this construction. Thus, the flow resistance inside filter disks 1, in the peripheral direction, is kept at a minimum. In essence, the present construction essentially prevents filtrate from being carried along in the peripheral direction as filter disks 1 rotate. Consequently, by decreasing the flow resistance, filter disks 1 may be rotated at a higher rotational speed while consuming a relatively low quantity of power.

As shown in FIG. 3, a radially external clamping flange 36 is provided, and to either side of flange 36, there is provided radially internal flanges 26 having a groove therein. In each of the grooves of flanges 26, there is located a sealing ring 37.

The concentrator, as shown in the drawings, utilizes only two parallel filter chambers 2. As a general rule, a concentrator of this type will consist of many more disks arranged parallel to one another. In such a case, outlet orifices 11 leading from filtrate chamber 3 are provided on the other end wall 21 of filtrate chamber 3. Thereafter, an outlet chamber 30 would be provided for the filtrate to continue along a sidewall of filter trough 5.

The concentrator, according to the present invention, provides many advantages including a relatively simple construction requiring only a few seals. Either one or two rotating seals 27 are needed so that the disks can be driven at a relatively high peripheral speed, for example, 20 revolutions per minute. It should be noted that at a high peripheral speed such as 20 revolutions per minute it is possible to achieve a high concentration output. For example, when the concentration of suspended particulates in the inlet material is generally between 0.4 and 1.2 percent by weight, the concentration of suspended particulates in the outlet material may reach a maximum of about 14 percent by weight, however, the concentration of suspended particulates in the outlet material is preferably between 6 and 10 percent by weight.

While the invention has been described as having a specific embodiment, it will be understood that it is capable of further modifications. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A disk concentrator comprising:
   a trough defining a cavity for receiving a suspension;
   an essentially drum-like structure with a peripheral wall at least one end wall which cooperate to define a filtrate collection chamber,
   said peripheral wall defining at least one filtrate inlet orifice,
   said at least one end wall defining at least one filtrate outlet orifice;
   a filter disk having a screen surface, said filter disk mounted on and rotatable with said filtrate collection chamber peripheral wall, said filter disk including a plurality of said segments circumferentially arranged around said peripheral wall and radially extending therefrom, said filter disk screen surface and said peripheral wall cooperating to define a filter chamber, which filter chamber communicates with said collection chamber through said filtrate inlet orifice,
   radial reinforcing ribs positioned between said segments, which ribs of adjacent filter segments define facing grooves, which reinforcing ribs include a tongue positioned in said facing grooves and operable as a sealing element;
   a means for rotating said filtrate collection chamber and filter disk; and, a rotating seal mounted on said collection chamber drum-like structure radially outward from said outlet orifice, which seal is operable to seal communication between said outlet orifice and said trough cavity.

2. A disk concentrator comprising:

a trough defining a cavity for receiving a suspension;

an essentially drum-like structure with a peripheral wall and at least one end wall cooperating to define a filtrate collection chamber, said peripheral wall defining at least one filtrate inlet orifice, said at least one end wall defining at least one filtrate outlet orifice;

a filter disk having a screen surface, said filter disk mounted on and rotatable with said filtrate collection chamber peripheral wall, said filter disk screen surface and said peripheral wall cooperating to define a filter chamber, which filter chamber communicates with said collection chamber through said filtrate inlet orifice, said filter disk including radially extending segments arranged around said collection chamber and retaing bolts and radial reinforcing ribs situated between said screen segments, which retaining bolts and reinforcing ribs hold said disk segments in position, the radial reinforcing ribs of adjacent disk segments including adjacent grooves and a tongue positioned in and between said adjacent grooves, said tongue serving as a sealing element;

means for rotating said filtrate collection chamber and filter disk; and a rotating seal positioned on one of said filtrate collection chamber peripheral wall and end wall radially outside said filtrate outlet orifice, which seal seals said outlet orifice from said trough cavity;

said trough defining a run-off chamber communicating with said filtrate collection chamber through said filtrate outlet orifice for removal of filtrate from said collection chamber and thus said suspension in said trough cavity.

* * * * *

UNITED STATES PATENT AND TRADEMARK OFFICE
CERTIFICATE OF CORRECTION

PATENT NO. : 4,781,835
DATED : November 1, 1988
INVENTOR(S) : Theodor Bahr et al It is certified that error appears in the above-identified patent and that said Letters Patent is hereby corrected as shown below:

```
Claim 2, Col. 6, line 2, change "retaing" to --retaining--;
Claim 2, Col. 6, line 6, before "disk" insert --filter--.
```

Signed and Sealed this

Second Day of May, 1989

Attest:

DONALD J. QUIGG

*Attesting Officer*  *Commissioner of Patents and Trademarks*